Oct. 2, 1951    A. LAURENT    2,569,612
MANUFACTURE OF REINFORCED CONCRETE PIPES
Filed Oct. 27, 1945    4 Sheets-Sheet 1

INVENTOR
ANDRE LAURENT

Oct. 2, 1951     A. LAURENT     2,569,612
MANUFACTURE OF REINFORCED CONCRETE PIPES
Filed Oct. 27, 1945     4 Sheets-Sheet 2
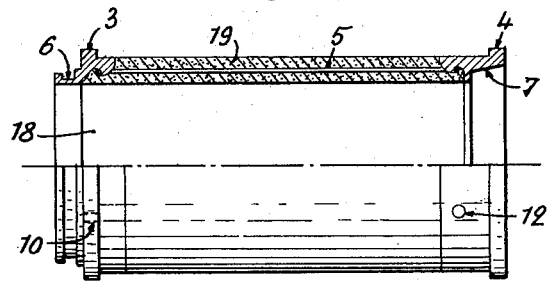
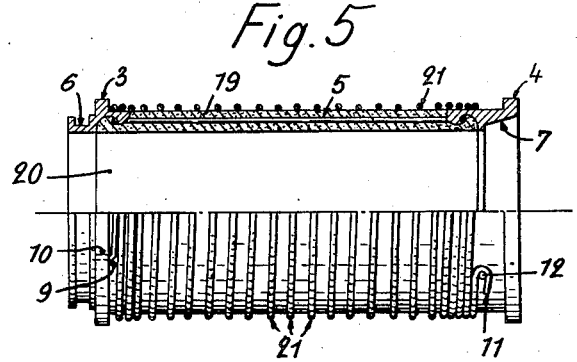
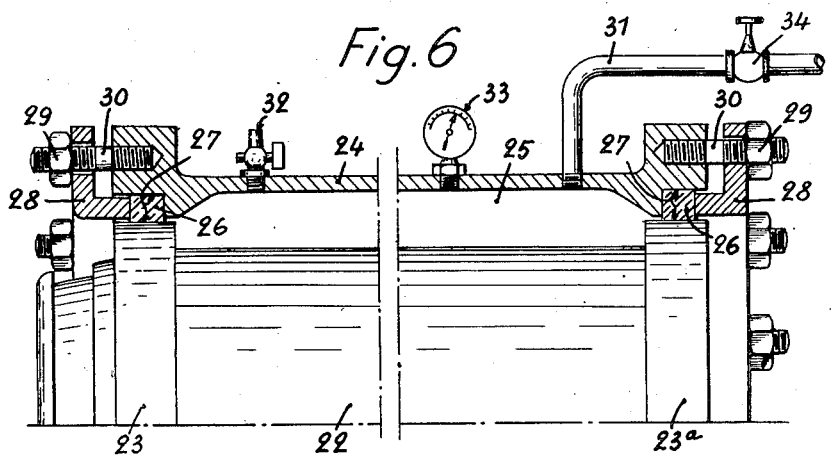
INVENTOR
ANDRE LAURENT Oct. 2, 1951 A. LAURENT 2,569,612
MANUFACTURE OF REINFORCED CONCRETE PIPES
Filed Oct. 27, 1945 4 Sheets-Sheet 3

INVENTOR
ANDRE LAURENT
BY
HIS ATTY

Oct. 2, 1951 A. LAURENT 2,569,612
MANUFACTURE OF REINFORCED CONCRETE PIPES
Filed Oct. 27, 1945 4 Sheets-Sheet 4
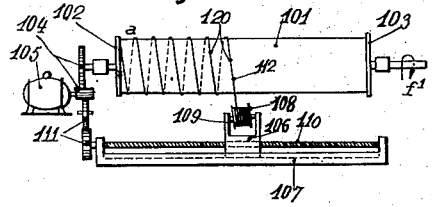
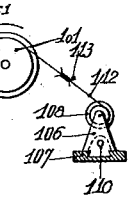
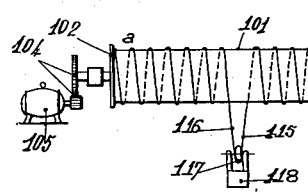
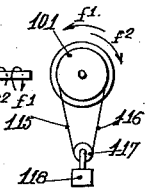
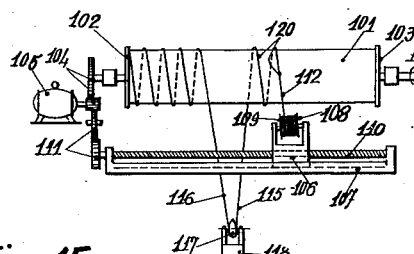
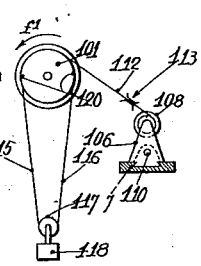
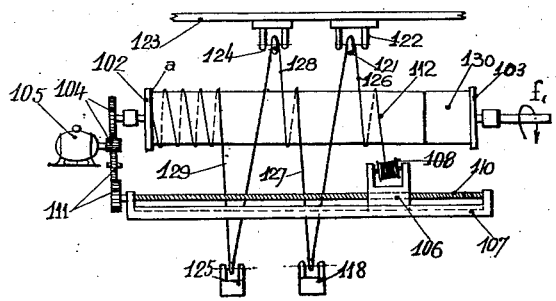
INVENTOR
ANDRE LAURENT
BY
HIS ATTY Patented Oct. 2, 1951

2,569,612

UNITED STATES PATENT OFFICE 2,569,612

MANUFACTURE OF REINFORCED CONCRETE PIPES

André Laurent, Paris, France, assignor to Societe Anonyme des Hauts-Fourneaux & Fonderies de Pont-a-Mousson, Brive, Corrèze, France Application October 27, 1945, Serial No. 624,986
In France August 14, 1941

Section 1, Public Law 690, August 8, 1946
Patent expires August 14, 1961

3 Claims. (Cl. 29—148.2)

It is well known to increase the resistance of pipes or other tubular bodies made of concrete or similar material by providing a stiffening steel wire, helically wound under tension around the tubular body.

The wire under tension exerts upon the concrete circumferential compression stresses, whereas an inner pressure, exerted upon a pipe thus reinforced, will generate in the whole structure circumferential traction stresses, which are partly balanced by an increase of the tension of the reinforcing wire, partly by a corresponding reduction in the compression of the concrete, and even partly by circumferential traction stresses in the concrete.

The cross-section of the concrete and reinforcing wire and the tension under which said wire is wound are usually so selected that, under the greatest inner pressure stresses to which the pipe may be subjected in service, the concrete will not be subjected to tension stresses. Any risk of cracking in the concrete pipes or the like is thus avoided and a perfect fluidtightness in service is preserved.

In the determination of the characteristics of the reinforcement due account should also be taken of the shrinkage of the concrete, particularly if the reinforcing operation is carried out shortly after casting the concrete. The decrease in the outer diameter of the pipe due to shrinkage will reduce the tension of the reinforcing wire already laid thus impairing the efficiency of the reinforcement. For this reason, the reinforcing wire is not wound, as far as possible, around a pipe until the latter has set and the shrinkage is completed.

Applicant discovered that, besides the above mentioned shrinkage, concrete is subject to deformation under the action of the compression stresses exerted by the reinforcing wire. Such deformation comprises an elastic deformation which is followed by a plastic or permanent deformation.

The elastic deformation occurs as soon as compression stresses are imposed upon the concrete; its value may be calculated in function of such stresses and of the modulus of elasticity of the concrete. Such deformation disappears as soon as relieved from the stresses.

On the contrary plastic deformation is developed in the course of time; occurring as soon as the reinforcing stress is exerted, it continues however to increase for several minutes after said stress has ceased to increase; it remains after the concrete has been relieved from the stress.

Experiments thus proved that a concrete pipe provided with a reinforcing wire is subjected to a plastic deformation which occurs some time after the reinforcing wire has been laid and results in a decrease of the outer diameter of the pipe and in decreasing the tension of the wire.

Such plastic deformation may be remedied, either by increasing the initial tension of the wire, or by increasing the cross-section thereof so that the residual compression stress will be sufficient in spite of the deformation of the concrete. But, such methods require either an improvement in the quality of the wire or an increase in the weight thereof and increase the cost.

The present invention has for its object to provide an improved reinforcing process for pipes and and other structures made of concrete or other materials possessing a certain plasticity, which avoids the above mentioned drawbacks and by which the quality and reinforcing action of the wire is fully available.

This process essentially consists in subjecting the pipe or the like to a preliminary external compression stress, preferably equal to or greater than the final reinforcing stress, maintaining said preliminary compression stress for a sufficient time to allow the concrete to assume its plastic deformation, relieving the pipe from said preliminary compression stress and finally providing the concrete pipe thus "predeformed" with a normal reinforcing wire, having the cross-section and the tension strictly required to support the tension generated by the inner pressure to which the pipe is subjected in service.

The invention also contemplates various devices for carrying out the above described process, as well as the pipes or other tubular members made of concrete or similar material, produced by the above process.

In the accompanying drawings, given solely by way of example:

Figs. 4 and 5 are views respectively similar to Figs. 1 and 2, showing the predeformed pipe before and after reinforcement;

Figs. 6, 7 and 8 are longitudinal cross-sections of hydraulic devices for producing compression and predeforming of a pipe;

Fig. 9 is a diagrammatical elevational view of a winding device for a precompression wire;

Fig. 10 is a corresponding transverse elevational view;

Figs. 11 and 12 are views similar to Figs. 9 and 10, respectively, showing a modification.

Figs. 13 and 14 are views similar to Figs. 9 and 10, showing another modification, and Figs. 15 and 16 are views similar to Figs. 9 and 10, respectively showing a further modification.

Figure 1:
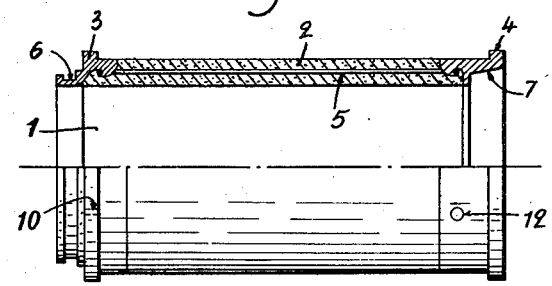
Figs. 1 and 2 are diagrammatical views, partly in elevation and partly in longitudinal cross-section, of a known type of concrete pipe before and after preliminary reinforcement, respectively.

Referring to Fig. 1, the pipe 1 to be reinforced consists of a central body 2, hereinafter called "pipe blank" made of concrete or reinforced concrete or any similar material, having at both ends metal end pieces 3 and 4. In this example, metal end pieces 3, 4 are connected together and to the concrete by a longitudinal reinforcement 5, put under tension, and adapted to longitudinally compress the concrete and to increase the fluidtightness and resistance of the pipe. End piece 3 has an extension 6 and end piece 4 a recessed portion 7, adapted to cooperate with sealing rings of any known type, for example of rubber, in order to ensure the fluidtight assembly of the elementary pipes.

The invention consists in providing pipe blank 2 with a reinforcement designed to increase its resistance to the internal pressure in service and consisting of a steel wire 8 (Fig. 2) wound under tension by any known method around the pipe. This steel-wire laid under tension is secured at both ends to the metal end pieces; for instance, the wire 8 is formed at one end with a hook 9 inserted into a recess 10 of end piece 3 and at the opposite end it is formed with another hook 11 engaging a lug 12 formed upon the periphery of end piece 4.

The cross-section and the tension of wire 8 will generally be so determined as to support the traction stresses generated in the wall of the pipe by the pressure, without exceeding the elastic limit of the metal. This condition leads to a winding tension almost equal to the permissible rate of fatigue, but slightly lower in order to take account of the contraction of the concrete under the helical turns of the wire in the course of winding. As the tension of the wire increases when the pipe is put into service, i. e. when the stresses resulting from the internal pressure are transferred to the wire which undergoes an elastic extension, the concrete is correspondingly decompressed whereby it has only to support very low stresses, if any.

In order to reduce the cross-section and the weight of the wire, the rate of fatigue should closely approach the elastic limit of the metal. For example, with ordinary steel wire having a tensile strength of 90 kg./mm.$^2$ and an elastic limit of 50 kg./mm.$^2$, the winding tension should be about 45 kg./mm.$^2$. The modulus of elasticity of such a steel being approximately 21,000 kg./mm.$^2$, the above indicated winding tension corresponds to an elastic elongation of the linear dimension of the test piece equal to:

45:21,000=0.00214 i. e. an elongation of .214%

Applicant found by accurate measurements on pipes and concrete test pieces, that the tension of the wire decreases during a few minutes after winding, due to a plastic or non-elastic compression of the concrete.

Under a compression stress of 150 kg./cm.$^2$, such plastic contraction may for example reach .1% of the linear dimension of the test piece, and may even sometimes exceed this value. Applicant also found that this contraction may slightly increase in the course of the first minute following application of the stresses, such increase being for example .017% during the first minute
.004% during the second minute
.003% during the third minute
.002% during the fourth minute
.001% during the fifth minute, etc.

The test piece practically thus reaches a state of balance within a short time.

Another fact discovered by applicant is that such plastic deformation occurs almost exclusively upon a first compression of the concrete. Under the effect of this compression, the concrete first undergoes an elastic deformation without alteration of structure; then, under the continuous action of the compression, the structural elements are progressively brought together and the concrete reaches a state of stable equilibrium. This corresponds to the permanent or plastic deformation and experience shows that this deformation is a limited one.

If the concrete is then again compressed, its structure is no longer capable of further substantial modification and any further deformation has the character of an elastic deformation, i. e. the test piece resumes the shape corresponding to the equilibrium as soon as the stresses are released.

As the reinforcing wire follows the deformations of the concrete, the plastic deformation thereof reduces the tension of the wire correspondingly. For a plastic contraction of .1%, the decrease in tension of the wire is about 21 kg./mm.$^2$. The wire will recover the tension and length it had when laid on, and the concrete thus undergoes an elongation which is substantially equal to its plastical contraction, which may cause cracking thereof and defective fluidtightness of the pipes.

This drawback could be overcome, by increasing either the initial tension or the cross-section of the wire. In the example illustrated above, maintaining a tension of 45 kg./mm.$^2$, after a plastic contraction of .1% of the concrete would require an initial winding tension of:

$$45+\left(21{,}000\times\frac{.1}{100}\right)=66 \text{ kg./mm.}^2$$

This involves the use of a steel having an elastic limit of at least 70 kg./mm.$^2$, i. e. a steel of rather higher grade than ordinary steel.

The wire may be made of ordinary steel provided it is wound under a tension not exceeding 45 kg./mm.$^2$, with an elongation not exceeding .214%. In such case, after a plastic contraction of .1% of the concrete, the tension of the wire will be only:

.214%−.1%=.114% corresponding to a rate of fatigue of $$21{,}000\times\frac{.114}{100}=23.94 \text{ kg./mm.}^2$$

The efficiency of the reinforcement is thus considerably impaired. In order to impart to the pipe the desired strength, it is necessary to correspondingly increase the section and weight of the wire, in a proportion of $$\frac{45-23.94}{23.94}=88\%$$

In both cases, the cost is substantially increased.

These drawbacks are avoided according to the invention by subjecting the concrete pipe blank, prior to the reinforcing operation, to one or more preliminary compression steps, in order to bring about a plastic contraction or "predeformation" of the concrete.

Figure 2:
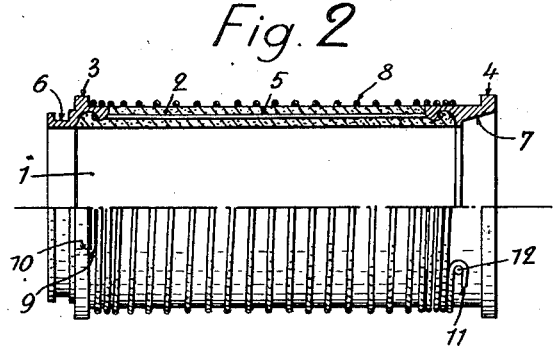
Figure 3:
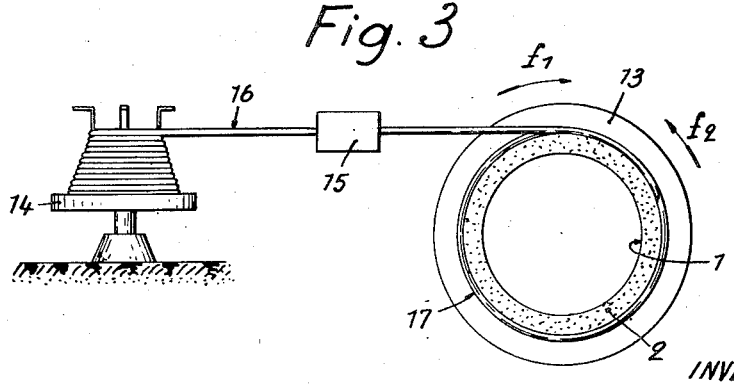
Fig. 3 is a diagrammatical transverse elevational view of a lathe used for predeforming the pipe.

This process may be carried out in various ways. In the embodiment of Figs. 1 to 3, pipe blank 2 is mounted on a lathe 13 and a compressing wire 16, fed from a bobbin 14, passes through a tension brake 15 and is wound at 17 in the direction of the arrow $f_1$, around the pipe blank. Brake 15 is adapted to set up a tension substantially equal to the rate of fatigue resulting from the maximum pressure which is contemplated in actual service.

Blank 2 is then removed from lathe 13 and the concrete is kept under the compression stress resulting from the tension of wire 17 in order to undergo its plastic deformation.

After a few minutes, the compressing wire 17 is removed, either by unhooking or cutting off one end and allowing said wire to unwind under its own tension, or by replacing pipe 1 on lathe 13 (Fig. 3) and rotating the latter in the direction of the arrow $f_2$, compressing wire 16 being rewound about bobbin 14 after passing through brake 15, which has been previously released.

Blank pipe 2 has been transformed by this process into a pipe 18 (Fig. 4), which after removal of the compressing wire, possesses the same external appearance as blank 2 shown in Fig. 1. However it essentially differs therefrom in that the concrete 19 of which it is made has undergone the whole amount of plastic contraction of which it is capable and can henceforth only undergo elastic deformations.

Pipe 18 is then subjected to a final "reinforcing" process, as distinguished from the "predeforming" process, and this may be carried out on an identical lathe and in similar conditions to said predeforming process so as to produce a reinforced pipe 20 (Fig. 5) having the same external appearance as the pipe blank of Fig. 2, but actually differing therefrom by the fact that the concrete core 19 has lost its plasticity, whereby the reinforcing wire 21 preserves its tension, and the pipe 20 its fluidtightness.

According to the embodiment shown in Fig. 6, the predeformation of a pipe blank 22, prior to the final reinforcing operation, is obtained by hydraulic means.

For this purpose, pipe blank 22, provided with its metal end pieces 23 and 23a, is inserted into a metal sleeve 24. The annular space 25 comprised between sleeve 24 and pipe blank 22 is made tight at both ends by means of sealing rings 26, housed in counterbores 27 and pressed therein by annular clamps 28, which in turn are held in place by means of nuts 29 screwing on screw threaded pins 30, integrally connected to sleeve 24.

The predeforming operation is carried out as follows:

Through a piping 31, water under pressure is forced into the annular space 25, while the air contained in said space escapes through a valve 32; when the air is completely discharged, valve 32 is closed and a pressure, measured by a pressure gauge 33, is allowed to be established within space 25, substantially equal to the maximum internal pressure which will be exerted within pipe 22, in service. Under the action of this external pressure, the concrete of pipe 22 undergoes a plastic contraction. When the latter is completed, the sealing joints 26 are released and removed from their housing and the predeformed concrete pipe is extracted from sleeve 24 and subsequently provided with a reinforcing winding.

The time required for the predeforming operation may vary from a few minutes to several hours; it increases with the thickness of the pipe, with the desired service pressure which determines the predeformation pressure, and with the hardening condition of the concrete. It also depends upon the means employed for the manufacture: thus the sleeves used for hydraulic predeforming being large and costly structures, it is advantageous, in order to cheapen their conditions of use, to reduce the duration of the operation.

The plastic deformation of the concrete may be accelerated by subjecting the pipe blank to an outer hydraulic pressure exceeding the pressure resulting from the action of the reinforcing wire. It may be carried out in successive compression steps, preferably of progressively decreasing duration.

Figure 7:
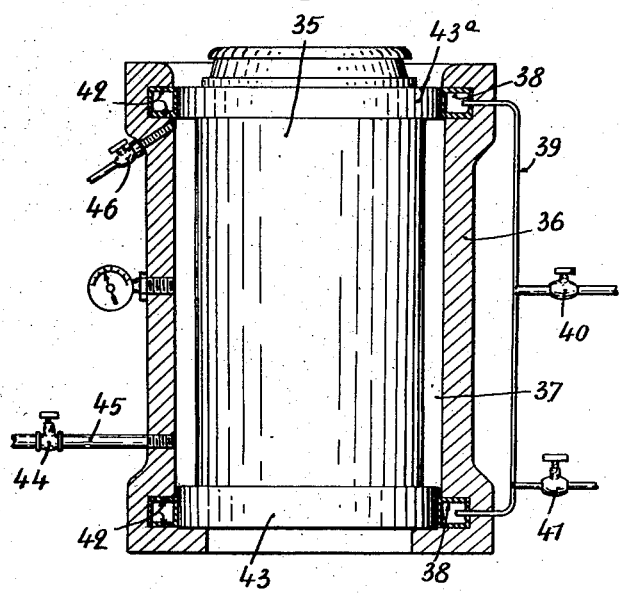

In the modified method illustrated in Fig. 7, the pipe blank 35 to be predeformed and the sleeve 36 are positioned vertically. Moreover, the sealing rings used to close the annular space 27 are constituted by hollow rubber rings 38, which may be connected to a water piping 39, controlled by a valve 40, so as to establish a pressure greater than the compressing pressure in chamber 38.

The operation is carried out as follows:

Sleeve 36 being empty and the pressure within hollow rings 38 being dropped by opening a discharge valve 41 connected to piping 39, said rings are retracted within their housing 42. Pipe blank 35 is lowered into sleeve 36 until it rests upon the base of said sleeve. Valve 41 is then closed and pressure fluid is admitted into piping 39. Rings 38 expand and tightly engage the end pieces 43 and 43a of the pipe. Hydraulic pressure is then applied through a valve 44 and a piping 45 into space 37; air is discharged through a discharge valve 46, and the predeforming treatment proceeds as explained hereinabove; upon completion of the treatment, pipe 35 is removed from sleeve 36, the various steps being carried out in the reverse order.

Figure 8:
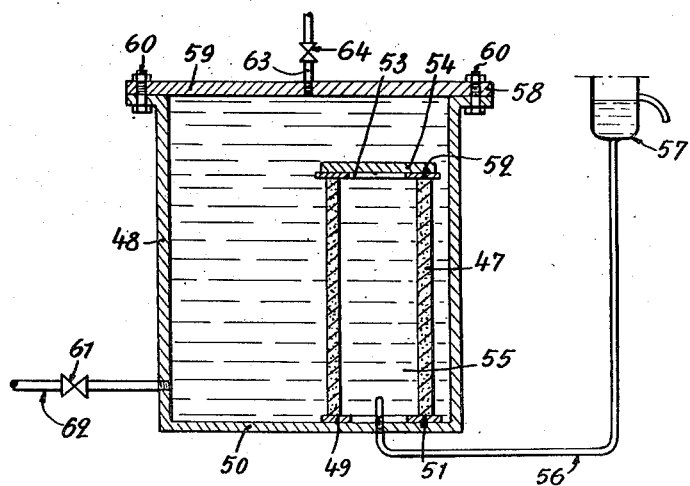

Fig. 8 illustrates a modification, which can be used for simultaneously predeforming several pipe blanks of small or medium diameter.

According to this modification, the pipe blank 47 to be treated is immersed into a large-sized strong tank 48 filled with water. A packing-ring 49, for example of rubber, is interposed between the bottom 50 of the tank and the lower edge 51 of the pipe. On the upper edge 52 of said pipe, is arranged a packing ring 53 and a solid plate 54. The internal cavity 55 of the pipe blank communicates through a piping 56 with a tank 57, open to the atmosphere and placed substantially at the same level as the upper portion 58 of the tank.

Predeformation is carried out as follows: Tank 48 is closed by a cover 59, secured by bolts 60, and valve 61 is opened, thus allowing water under pressure from piping 62 to complete the filling of said tank, while the air is discharged therefrom through a piping 63, fitted with a discharge valve 64, which is thereafter closed. The pressure exerted on pipe blank 47 ensures predeformation as in the preceding example. If the packing joints 49 and 53 are defective, piping 56 discharges toward tank 57 any water which may leak into the pipe blank which prevents an undesirable pressure from building up within said pipe.

Tank 48 may advantageously be adapted for the simultaneous treatment of a plurality of pipe blanks, in particular pipes of small or medium diameter, placed side by side or in superposed relation, the inner space of each pipe blank being connected to the discharge tank 57.

According to the embodiments illustrated in Figs. 9 to 16, the same wire is used for the final reinforcement and for precompression, said wire being rewound for reinforcing as it is being unwound after predeformation, with a tension equal to or less than that under which it has previously been wound.

In all embodiments shown in Figs. 9 to 16, the blank 101 to be reinforced is mounted between two discs 102 and 103 on a lathe. Disc 102 is driven through a gearing 104 by an electric motor 105.

The lathe comprises a carriage 106, movable along a slide 107 and carrying a winding spindle 108, on which is fitted a spool of steel wire 109, for example. Carriage 106 is controlled by a rotary screw 110, actuated by motor 105 through a gearing 111.

In the embodiment of Figs. 9 and 10, the precompression winding operation proceeds as follows: The pipe blank 101 is placed between discs 102 and 103 of the lathe, slide 106 being at one end of the slide. The steel wire 112 is secured by any suitable means to one end of the pipe blank at $a$ and the motor is started, so as to rotate discs 112 and 113 and pipe 101 in the direction of arrow $f_1$. Wire 112 is thus wound around pipe blank 101 in the form of a helix, whose pitch depends on that of screw 110 and on the ratio existing between the angular speeds of said screw and pipe.

The tension necessary for pre-compression of the concrete may be produced by providing between the unwinding device and the pipe blank a brake 113 as in Fig. 10 or 15 as in Figure 3. However, braking takes up a considerable amount of power and this may be avoided by eliminating the brake and carrying out the winding operation in two steps: in the first step the wire is wound about the pipe as described above with reference to Fig. 9, but without any tension, that is, disregarding friction, without any power expenditure.

When this first winding is performed, the wire is cut off, leaving a free length whose end is fixed on the pipe at $b$ (Figs. 11 and 12). The extra length of wire forms a loop 115, 116 in which is mounted a tensioning device, comprising for example a roller 117 and a counterweight 118, the weight of which is substantially equal to twice the tension of precompression to be applied.

The lathe is then started in a reverse direction (arrow $f_2$). During this second step of the operation, the original winding is unwound in the portion 116 of the wire, while said wire is rewound at the same time in the portion 115, but this time under tension. Said tension is equally distributed on both portions 115 and 116, and there is no resisting torque (except for friction losses). The power required for putting the wire under tension is supplied by the descent of the counterweight corresponding to the elongation of the wire produced by the tension.

When the winding is completed, and after a time which depends upon the characteristics of the concrete, the pipe will have undergone its full plastic shrinkage; the tension of precompression may be then released in order to carry out the final reinforcing.

The tensioning weight 118 now engages the end of the wire; the load of said counter-weight is reduced so as to lower the tension of the wire to the value corresponding to the final reinforcement of the pipe and the lathe is started in the reverse direction (arrow $f_1$). During this third step of the operation, the wire is unwound in the portion 115, and re-wound through the portion 116, but this time under the reinforcing tension. The resisting torque is reduced to the friction forces and the power generated by the reduction in tension of the wire is taken up by the upward movement of the counter-weight due to the shortening of the wire under the reduced tension.

According to the modification illustrated in Figs. 13 and 14, the first two precompression winding steps above described are carried out simultaneously; while the portion 112 of the wire is wound under low tension, one or more dead turns 120 are provided to maintain under tension the portion 115 of the loop 115—116 which carries the tensioning device 117. The load of this counter-weight 118 corresponds to substantially twice the precompression tension to be achieved.

The portion 115 of the wire is unwound as fast as the portions 112 and 116 are wound. The tension of portion 112 being negligible and the tension of portions 115 and 116 being equal, the resisting torque is still substantially reduced to friction; the power corresponding to tensioning the wire is supplied by the descent of counterweight 118.

This modification offers an additional advantage in that the rate at which the precompression operation may be carried out is increased.

This time may be still further reduced by carrying out simultaneously the precompression and final reinforcing steps. To this end, a brake may be provided in the device of Figs. 13 and 14 immediately beyond spindle 108, so as to directly impart to the portion 112 of the wire the precompression tension, whereby the load of counterweight 118 will be calculated in order to provide for the final reinforcing tension.

However, the provision of a brake offers the drawback already mentioned and the preferred method is the one illustrated in Figs. 15 and 16.

According to this embodiment, the wire fed from spindle 108 is wound without tension over a few turns, passes over a guiding pulley 121, arranged over the lathe in a carriage 122, movable along a rail 123, extending parallel with the lathe, then over a tensioning roller having a counterweight 118 for imparting to the wire a tension corresponding to the precompression; the wire is again wound around the pipe by a suitable number of turns, passes over a second guiding-pulley 124, then over tensioning roller 125, imparting to the wire the final tension, and is finally wound about the pipe under its normal reinforcing tension.

Pulleys 121 and 124, which are not essential, are adapted to eliminate the flexing stresses exerted upon the pipe during winding. For this purpose, the pulleys are so positioned that the portions 126, 127 and 128, 129 of the wire will be parallel. Pulleys 122 and 124 can also be so located that the portions 126 and 127 on the one hand and 128 and 129 on the other will be in alignment with each other. Guiding pulleys may also be used in connection with the other embodiments of the invention above described.

In order to facilitate the operation, the disc 103 of the lathe may be provided with a drum 130, having the same diameter as the pipe and around which are wound the last turns of wire, either those with or those without tension, in order that the final turns may cover the entire length of the pipe.

It should be observed that the invention provides for the possibility not only of compensating for the plasticity of the concrete but also for the non-plastic deformation of the wire and particularly the shrinkage of the various lengths thereof when use is made of a cable embodying several wires. The preliminary winding of the armature under a tension greater than the desired reinforcing tension moreover constitutes a test of the resistance of said wire or cable and imparts to the pipes thus obtained an increased value.

Of course, the invention is in no wise limited to the embodiment illustrated and described hereinabove, selected only by way of example.

Thus, the pipe blank to be treated may be deprived of longitudinal reinforcement and of metal end pieces and may end in a cylindrical portion or by a spigot or a flange or any other assembling means.

The reinforcing wire may be constituted by one or more wires of circular or other cross-section, made of ordinary steel or of any other metal or alloy; or drawn out, quenched, etc. Each reinforcing wire may be secured to the ends of the pipe by hooking, welding or any other fastening means.

The tensile strength, elastic limit, elongation and rate of fatigue of the wire may vary between extensive limits.

The tensile strength, compactness and plasticity of the concrete may also vary extensively; the plastic deformation of the concrete may take up widely varying intervals of time, provided that it has a limited value.

In the case of hydraulic predeformation, the sleeve may be made of metal or of any other material. It may for example be constituted by a reinforced concrete pipe similar to those with which the invention is concerned. The length and the other dimensions of the sleeve are immaterial and the seals used may be of any known type. The tanks used for predeformation of the pipe may be provided with expansion or discharge tanks.

Finally, the duration of the predeformation treatment and the number of successive compression steps may vary in accordance with the characteristics of the pipes to be produced.

Having now described my invention what I claim as new and desire to secure by Letters Patent is:

1. A process for manufacturing reinforced concrete conduits adapted to withstand a high internal pressure, which comprises: applying to the surface of said conduit an external radial predeforming compression force by spirally winding under tension a wire around said conduit, said force being applied to said conduit after the latter has become self-sustaining and while the concrete in said conduit retains a degree of plasticity; maintaining said force on said surface for a controlled length of time required to produce a permanent deformation and contraction throughout said conduit and until said degree of plasticity has been substantially reduced; at the end of said length of time removing said wire to remove said force; and thereafter winding around said permanently deformed and contracted conduit a flexible reinforcing member under a predetermined permanent tension.

2. A process for manufacturing reinforced concrete conduits adapted to withstand a high internal pressure, which comprises: applying to the surface of said conduit an external radial predeforming compression force by spirally winding under tension a wire around said conduit, said force being applied to said conduit after the latter has become self-sustaining and while the concrete in said conduit retains a degree of plasticity; maintaining said force on said surface for a controlled length of time required to produce a permanent deformation and contraction throughout said conduit and until said degree of plasticity has been substantially reduced; at the end of said length of time removing said wire to remove said force; and thereafter winding around said permanently deformed and contracted conduit a flexible reinforcing member under a predetermined permanent tension, the tension creating said force being substantially equal to said permanent tension.

3. A process for manufacturing reinforced concrete conduits adapted to withstand a high internal pressure, which comprises: applying over the peripheral surface of said conduit an external radial predeforming compression force by spirally winding under tension a first flexible member on said conduit, said force being applied to said conduit after the latter has become self-sustaining and while the concrete in said conduit retains a degree of plasticity; maintaining said force over said surface for a controlled length of time required to produce a permanent uniform deformation and contraction throughout said conduit and until said concrete has lost its said degree of plasticity; at the end of said length of time removing said first flexible member to remove said force; and thereafter winding around said permanently deformed and contracted conduit another flexible reinforcing member under a predetermined permanent tension; the tension creating said force being not less than said permanent tension.

ANDRÉ LAURENT.

REFERENCES CITED

The following references are of record in the file of this patent:

UNITED STATES PATENTS

| Number | Name | Date |
|---|---|---|
| 1,804,888 | Monsch | May 12, 1931 |
| 2,048,253 | Freyssinet | July 1, 1936 |
| 2,072,273 | Obert | Mar. 2, 1937 |
| 2,191,025 | Mitchell | Feb. 20, 1940 |
| 2,217,090 | Zerbe | Oct. 8, 1940 |
| 2,273,736 | Raymond et al. | Feb. 17, 1942 |
| 2,348,765 | Trickey et al. | May 16, 1944 |
| 2,375,921 | Hirsh | May 15, 1945 |

FOREIGN PATENTS

| Number | Country | Date |
|---|---|---|
| 338,934 | Great Britain | Nov. 25, 1930 |